United States Patent [19]

Naylor

[11] 4,003,356

[45] Jan. 18, 1977

[54] VAPORIZED FUEL SYSTEM FOR INTERNAL COMBUSTION ENGINES

[75] Inventor: Harry E. Naylor, Minneapolis, Minn.

[73] Assignees: Harry E. Naylor, Minneapolis, Minn.; Flora L. Naylor, Belle Vernon, Pa.; John L. Naylor, East Chicago, Ind.; Joseph Naylor, Belle Vernon, Pa.; Lucille E. Hannan, Clairton, Pa.; Eliza M. Naylor, Belle Vernon, Pa.; Daniel Hannan, Clairton, Pa.

[22] Filed: Mar. 12, 1975

[21] Appl. No.: 557,774

[52] U.S. Cl. .................... 123/122 E; 123/133
[51] Int. Cl.[2] ........................... F02M 31/00
[58] Field of Search .......... 123/122 E, 133, 122 H, 123/179 H; 261/144 X

[56] References Cited

UNITED STATES PATENTS

| 1,373,477 | 4/1921 | Angus | 123/133 |
| 1,406,766 | 2/1922 | Shipp | 123/122 E |
| 1,507,315 | 9/1924 | Hunt | 123/122 H |
| 1,800,426 | 4/1931 | Bachle | 123/122 H |
| 2,746,440 | 5/1956 | Eriksen | 123/133 |
| 3,354,872 | 11/1967 | Gratzmuller | 123/122 E |

FOREIGN PATENTS OR APPLICATIONS

| 840,643 | 4/1939 | France | 123/133 |
| 51,144 | 7/1932 | Germany | 123/133 |

Primary Examiner—Ronald H. Lazarus
Attorney, Agent, or Firm—James R. Haller; Warren A. Sturm

[57] ABSTRACT

A fuel system for providing fully vaporized, air-free gasoline to a carburetor of an internal combustion engine. The system includes an air-free liquid gasoline receptacle having means maintaining a liquid free space above the surface of liquid gasoline in the receptacle, a heater within the receptacle and having an expanded surface of which at least a substantial portion extends upwardly out of the liquid gasoline into the space there above, means for producing a vacuum within the receptacle to promote evaporation of liquid gasoline from the expanded surface and for compressing the resulting gasoline vapors, and air-free means for filtering condensed droplets of gasoline from the resulting gas vapors.

13 Claims, 3 Drawing Figures

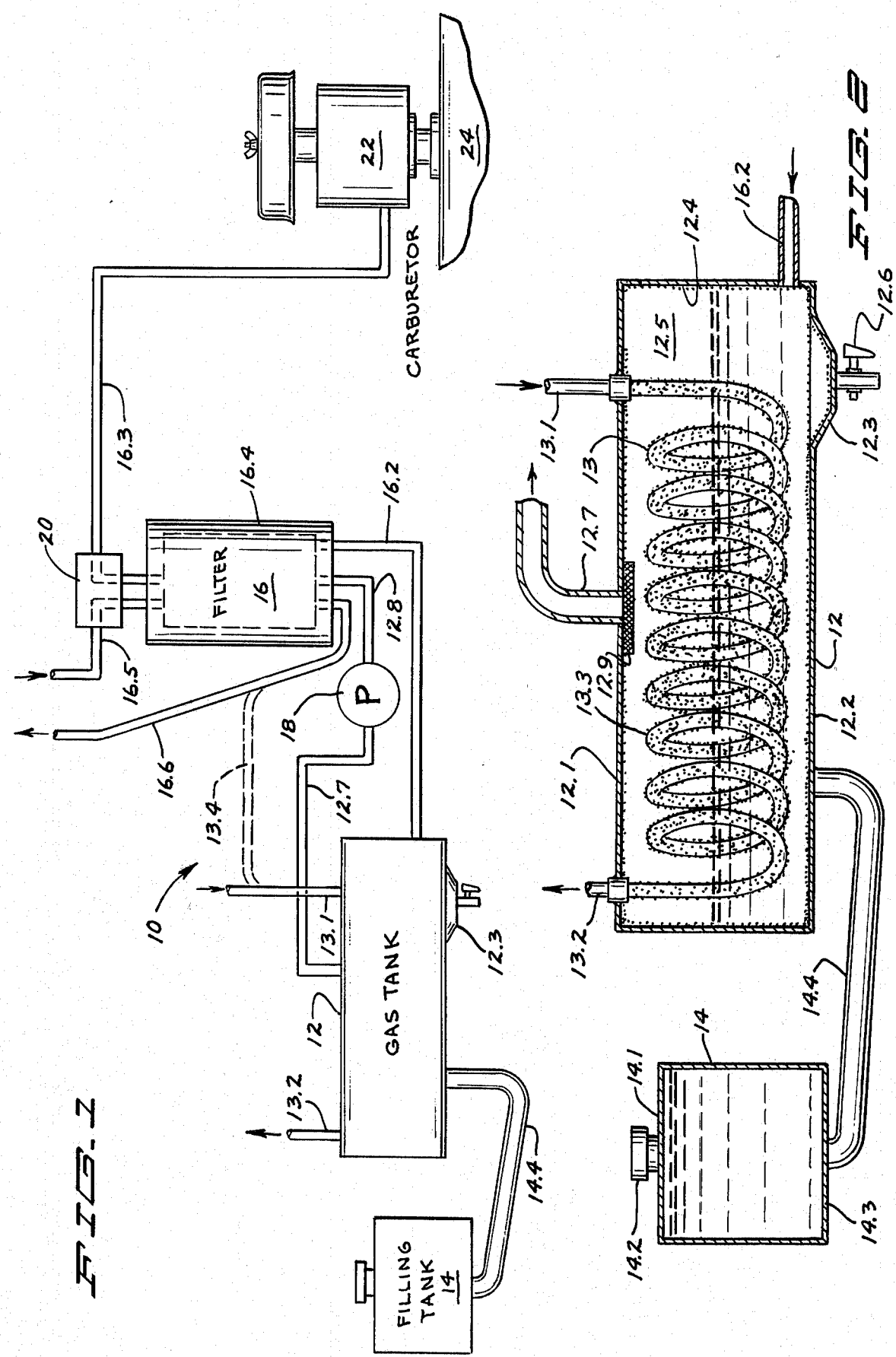

VAPORIZED FUEL SYSTEM FOR INTERNAL COMBUSTION ENGINES

BACKGROUND OF THE INVENTION

The emission in the exhaust gas of internal combustion engines of unburned hydrocarbons and like pollutants is due at least in part to the carburetion systems of present-day automobiles wherein liquid gasoline is atomized and mixed with air to provide a fuel-air mixture. Because of poor carburetion, the very tiny gasoline particles are not completely burned. This problem is particularly severe during start and warm-up of an automobile engine.

Many researchers have attempted to find solutions to this serious problem, spurred on by standards set by the Federal Government. One solution to this problem is reported in U.S. Pat. No. 3,794,000 in which low boiling components of gasoline are removed from bulk gasoline by vaporization, are then recondensed, and are preferentially fed to the engine during starting and warm-up. To the best of my knowledge, neither this solution nor others have proven themselves satisfactory from a practical standpoint.

BRIEF SUMMARY OF THE INVENTION

The present invention relates to a fuel system which provides a continuous flow of air-free, fully vaporized gasoline to the carburetor of an internal combustion engine, thereby eliminating or minimizing the production of unburned hydrocarbon products in the engine exhaust. The fuel system includes an air-free gas receptacle including fuel addition means permitting the air-free addition of gasoline to the receptacle, and also means maintaining a liquid-free space above the level of liquid gasoline in the receptacle. A heater is provided within the receptacle to heat the liquid gasoline, the heater having an expanded surface provided by glass wool or the like and extending from within the liquid gasoline to a position substantially above the liquid gasoline level in the receptacle. Pump means are provided to produce a vacuum within the receptacle to promote evaporation of gasoline from the expanded surface, and downstream from the pump means are provided filter means for filtering condensed droplets from the gas vapors before the latter are led to the carburetor of an internal combustion engine. From the receptacle to the carburetor in which the gasoline vapors are mixed with air, the gasoline, both in its liquid and vapor state, are positively maintained free of air so as to avoid the possibility of accidentally producing prematurely an explosive gas-air composition.

DESCRIPTION OF THE DRAWING

FIG. 1 is a schematic representation of the fuel delivery system of the invention;

FIG. 2 is a partially schematic, broken away view in partial cross section showing a portion of the fuel delivery device of the invention.

DETAILED DESCRIPTION OF THE PREFERRED EMBODIMENT

Figure 3:
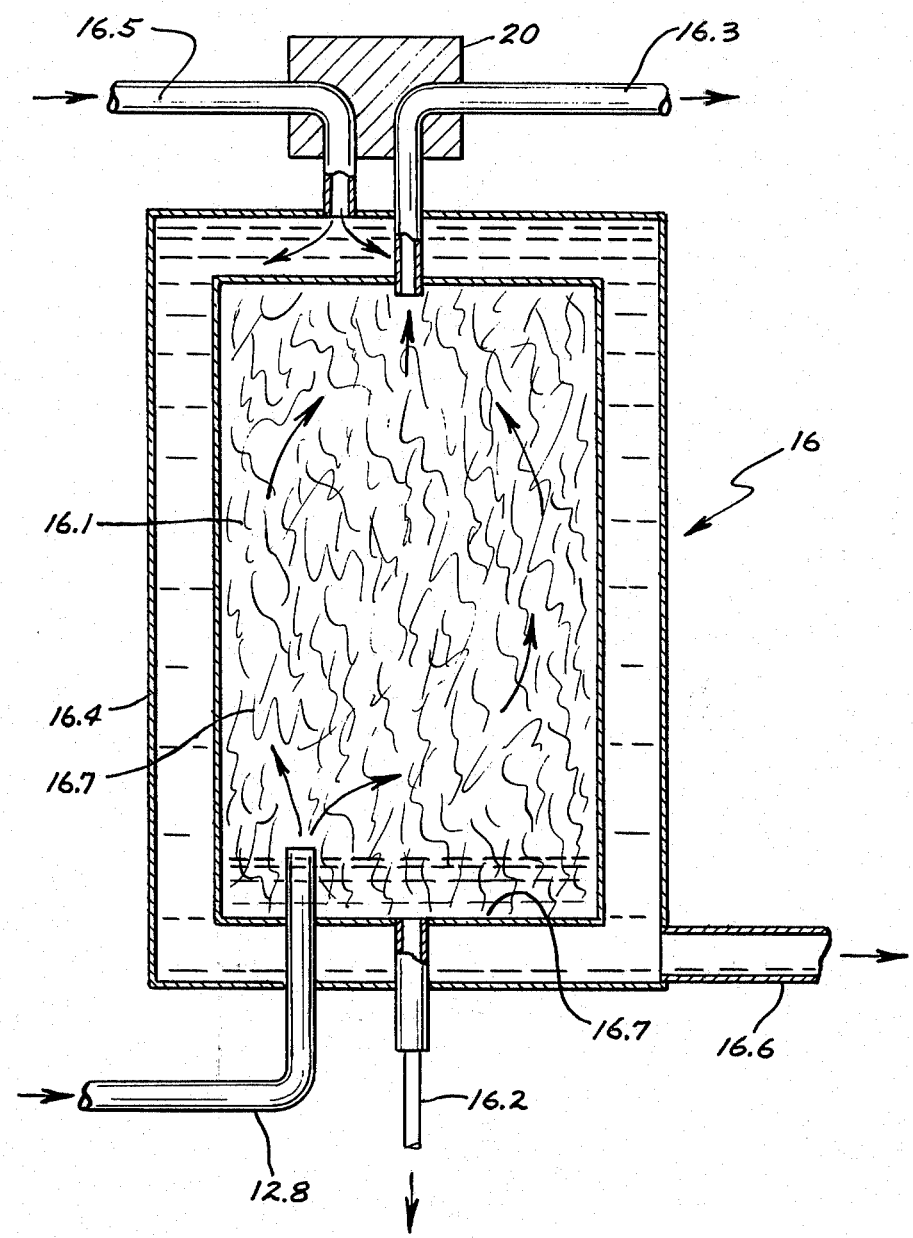
FIG. 3 is a partially schematic, cross-sectional representation of a vapor filter useful in the device of the present invention.

Referring first to FIG. 1, the device 10 of the invention includes a gas receptacle 12, a filling tank 14 positioned adjacent and slightly below the gas receptacle for adding gasoline in an air-free manner to the receptacle, a filter 16 for filtering gasoline droplets from an air-free gasoline vapor, a pump 18 for drawing a vacuum within the gas receptacle to promote vaporization, and to compress the resulting gasoline vapors and convey them to the filter 16, a control 20 for maintaining the flow of gasoline from the filter at a substantially constant rate, and a carburetor 22 for mixing the air-free gasoline vapors with air to form an air-gasoline mixture which is then led to an internal combustion engine 24.

Referring now to FIG. 2, which shows the gas receptacle and filling tank in greater detail, the gasoline receptacle 12 is made of a corrosion and pressure-withstanding materials such as steel, and has a significantly greater dimension in the horizontal direction than in the vertical direction. A filling tank 14 is provided adjacent the gas receptacle with an upper wall 14.1 spaced significantly below the upper wall 12.1 of the gas receptacle. In its top wall 14.1, the filling tank is provided with a filling orifice fitted with an airtight cap 14.2. The floor 14.3 of the filling tank is similarly positioned below the level of the floor 12.2 of the gas receptacle. A filler tube 14.4 extends between the bottom of the filling tank and the bottom of the gas receptacle.

The floor 12.2 of the gas receptacle has a depressed area 12.3 equipped with a drain cock 12.6 to permit the withdrawal from the receptacle of extremely high boiling hydrocarbon fractions, as will be explained below. The inner walls 12.4 of the receptacle are provided with an expanded surface, which may take the form the glass wool or other material capable of "wicking" gasoline upwardly as a result of capillary action.

A heater for heating the gasoline within the receptacle may take the form of a coil of metal tubing 13 through which hot water from the radiator is pumped, the ends 13.1 and 13.2 of the tube extending in an airtight fashion through the walls of the gas receptacle for communication with the radiator. As shown in FIG. 2, the coils of the tubing 13 are maintained partially beneath the surface of gasoline within the gas receptacle, but extend a significant distance into the liquid free space 12.5 within the receptacle. The heater tube 13 is provided with an expanded outer surface 13.3 by applying to the tubing a wicking material of the type used on the inner walls of the receptacle; the wicking material may, for example, be glass wool, abestos fibers or fabric, etc., through which gasoline is drawn by capillary action.

A vapor transporting tube 12.7 leads from the vapor space 12.5 above the level of liquid gasoline in the gas receptacle to the vapor pump 18. The pipe 12.7 may be wrapped with suitable insulation to prevent undue heat loss from the vapors therewithin. The end of the pipe which communicates with the gas receptacle may include a small filter 12.9 or other device capable of preventing liquid gasoline from passing into the vapor tube, and this end is positioned at or adjacent the center of the upper wall 12.1 so as to avoid contact with liquid gasoline as the latter moves within the receptacle 12 a vehicle speeds up, slows down, or turns at high speed. The vapor pump 18 may be an electrically driven piston pump or the like which is capable of drawing a substantial vacuum within the gas receptacle and of pressurizing the vaporized gasoline passing therethrough.

A gasoline vapor filter, which may be of the canister type shown in FIG. 1, is provided downstream from the pump 18 and is shown best in FIG. 3. The filter 16 there depicted comprises an inner, vapor compartment 16.1 substantially completely filled with a filtering medium of high permeability such as glass wool, the filtering medium being chosen so as to filter and retard the passage of gasoline droplets which may form in the tubing 12.8 leading from the pump 18 to the filter 16. The gasoline droplets which are thus filtered coalesce at the bottom of the inner compartment, and a return tube 16.2, which is preferably of small diameter compared to the vapor tubes 12.7 and 12.8, is provided to convey the coalesced droplets back to the gas receptacle 12. In one embodiment, it may be desirable to lead the resulting gas droplets to the carburetor instead for the purpose of furnishing gasoline of high volatility to the engine during start up. At its upper end, the inner compartment 16.1 has a port in which is sealed a vapor conduit 16.3 for carrying air-free vaporized gasoline to the engine carburetor for eventual mixture with air.

Surrounding the inner, vapor compartment 16.1 is a liquid heating jacket 16.4. Liquid lines 16.5 and 16.6 lead to and from the jacket 16.4 to convey radiator fluid from the radiator to and from the jacket to heat the inner, vapor compartment 16.1 and to prevent undue condensation of the vapors therewithin.

A control 20 (FIG. 3) is provided at the vapor outlet line 16.3 and at the water inlet line 16.5 to sense the pressure within the vapor line 16.3 and to resultingly control the flow rate of incoming, hot radiator fluid through the tube 16.5. Although depicted in schematic form in FIGS. 1 and 3, it will be understood that control 20 may take the form of a pressure-actuated flow control valve whereby an increase of vapor pressure within the outlet tube 16.3 decreases the flow rate of radiator fluid through the tube 16.5, and vice versa. It will now also be understood that the control 20 may not only act upon the flow rate of radiator fluid entering the pipe 16.5 for heating the filter, but may also, and preferably does, act upon the flow rate of radiator fluid entering the heat tube 13 in the gas receptacle. In one embodiment, the radiator fluid exiting from the jacket 16.4 of the filter may be passed directly, through line 13.4, to the heater tube 13, in which event the control 20 acts to govern the temperature of heating fluid in both the jacket 16.4 of the filter and also in the heater tubing 13.

With reference again to FIG. 3, it will be understood that the vapor tubing 12.8 leading to the filter extends upwardly a short distance beyond the lower wall 16.7 of the filter in order to prevent coalesced droplets of gasoline from passing downwardly and rearwardly through the tubing 12.8 and into the pump 18.

The warm, compressed gasoline vapors, which are free from air and from gasoline droplets and which emerge through the outlet tube 16.3 from the filter are then led to the carburetor for mixture with air.

In operation, gasoline may be added to the receptacle 12 by removing the pressure cap 14.2 from the filling tank, and filling the latter tank to its brim. Since the top wall 14.1 of the filling tank is always spaced downwardly from the top wall 12.1 of the gas receptacle, gasoline within the latter receptacle cannot reach a level substantially higher than that of the top of the filling tank, and as a result the existence of vapor space 12.5 within the gas receptacle is insured. The bottom wall, or floor 14.3 of the filling tank similarly is positioned a substantial distance below the floor 12.2 of the gas receptacle to prevent air which may enter the filling tank from entering the gas receptacle and contaminating the same. That is, at such time as the gas receptacle has been nearly emptied of fuel, fuel will yet remain in the bottom portion of the filling tank 14. The filling cap 14.2 may, if desired, be a simple pressure cap which prevents gasoline from within the filling tank from flowing outwardly through the cap but which will permit air to enter the filling tank as gasoline is passed through the filler tube 14.4 into the gas receptacle. In this manner, if the small vacuum within the vapor space 12.5 in the receptacle is neutralized, the gasoline which tends to flow back through the filler pipe 14.4 and into the filling tank will not cause the filling tank to overflow.

The hot water or radiator fluid entering the heater tube 13 within the gas receptacle warms the gasoline within the receptacle and hence promotes vaporization of the gasoline. As a vehicle bearing the gas tank is in motion, gasoline within the receptacle 12 will tend to splash against the coils 13 of the heater tube which project above the normal liquid gasoline surface; in addition, gasoline will tend to "wick" up into the expanded surface of glass wool or the like surrounding the heater tube. Because of the raised temperature of the gasoline in the receptacle, the expanded surface from which gasoline can evaporate, and the vacuum which is drawn in the receptacle by the pump 18, vaporization of the liquid gasoline within the receptacle is encouraged and the vapors which are thus formed pass through the vapor tube 12.7 and into the pump 18. It is recognized that since the lower boiling fractions of liquid gasoline may be preferentially vaporized, the gas receptacle may after a number of fillings become enriched in high boiling gasoline fractions. As the gas receptacle nears its empty position, the highest boiling gasoline fractions will be received within the depressed portion 12.3 at the bottom of the tank, and can be drained from the tank by opening the cock 12.6. In this manner, the exhaust of the vehicle is maintained substantially free of very high boiling hydrocarbon emissions, and the hydrocarbon fraction which is removed through the cock 12.6 may be used for other purposes common to high boiling liquid hydrocarbons; e.g., as a solvent.

The vapors under subatmospheric pressure which are carried by the vapor tubing 12.7 are compressed by the pump 18 to a pressure above atmospheric and are passed thence through the vapor tubing 12.8 into the bottom of the filter 16. The pressurization imparted to the vapors by the pump 18 tends to cause droplets of gasoline to appear in the vapors entering the filter, and such particles are captured by the porous filter material 16.7 within the filter and drained downwardly in a coalescing fashion to form a layer of liquid at the bottom of the filter, as shown best in FIG. 3. Since the pressure within the inner filter compartment will normally be above atmospheric pressure, a pressure differential exists across the ends of the return tube 16.2, and the coalesced liquid gasoline at the bottom of the filter is hence urged to return to the gas receptacle. The narrow diameter of the tube 16.2 in relation to the vapor tubes 12.7 and 12.8 retards the flow of liquid gasoline through the tube 16.2 so that the pressure within the inner filter compartment is continuously maintained above that in the gas receptacle. If desired, the return tube 16.2 may be provided with a valve (not shown) regulating the flow resistance imparted by the tube 16.2. It will also be understood that the vapor tube 12.8 extending between the vapor pump 18 and the filter will ordinarily be provided with insulation to retard the loss from the tube of heat developed as the vapors are compressed by the pump 18.

The vapor tube 16.3 which extends between the filter 16 and the carburetor of an internal combustion engine may similarly be provided with insulation to retard the loss of heat from the vapors passing therethrough. When the device of my invention is mounted in a motor vehicle, such that the gas receptacle 12 is spaced a considerable distance from the engine, I desire to maintain the vapor tubes 12.8 and 16.3 as short as possible, and thus the filter 16 and pump 18 desirably are placed in close proximity to the carburetor 22. It will be noted that my device is a closed system; that is, from the gas reservoir through the vapor delivery tube 16.3, air is prevented from coming into contact with the fuel. In this manner, the accidental production of combustable mixtures of air and gasoline ia avoided and the liquid and vaporized gasoline can thus be safely heated as desired.

Manifestly, I have provided a vaporized fuel delivery device for internal combustion engines which delivers fully vaporized gasoline free from gasoline droplets and from air. Gasoline vapors which are delivered to the carburetor of an internal combustion engine are fully vaporized and warmed, and result in reduced exhaust emissions of high boiling unburned hydrocarbons. Substantially all of the gasoline vapors which thus enter the engine are burned, leading to a reduction in the rate of fuel use per distance traveled.

While I have described a preferred embodiment of the present invention, it should be understood that various changes, adaptations, and modifications may be made therein without departing from the spirit of the invention and the scope of the appended claims.

What is claimed is:

1. Gasoline delivery apparatus for delivering vaporized gasoline free from air and gasoline droplets to an internal combustion engine, comprising a gasoline receptacle; filler means for maintaining the receptacle free of air while permitting the addition of gasoline to the receptacle and maintaining within the receptacle a vapor space above the liquid gasoline level; a heater for heating the gasoline within the receptacle and having an expanded surface extending upwardly into the vapor space; a pump communicating with the vapor space in the receptacle for producing a vacuum in the latter to urge evaporation of gasoline from the expanded surface, and to compress the gasoline vapors; a filter communicating with the high pressure side of the pump to remove gasoline droplets from the vapors compressed by the pump; and means for conveying the filtered gasoline vapors to an internal combustion engine; the gasoline receptacle, pump and filter being sealed from contact with the atmosphere, whereby the gas vapors so delivered are air-free.

2. The apparatus of claim 1 including means for heating the vapors downstream from the pump to retard vapor condensation.

3. The apparatus of claim 2 wherein said heating means includes a heater in heat-exchanging proximity to gasoline vapors in the filter.

4. The apparatus of claim 1 wherein the heater heating gasoline in the receptacle comprises a heat exchanger for conveying engine heat to gasoline within the receptacle.

5. The apparatus of claim 1 wherein the heater comprises a length of coiled tubing within the gasoline receptacle and having an expanded outer surface.

6. The device of claim 1 including control means responsive to the pressure of the vapors compressed by the pump, and resultingly controlling the quantity of heat supplied to gasoline in the gasoline receptacle, the control means reducing or increasing the quantity of heat supplied in response to a respective increase or decrease in said vapor pressure.

7. The device of claim 1 wherein said filler means comprises a gasoline filler tank having an upper wall spaced below an upper wall of the gasoline receptacle.

8. A gasoline delivery device for delivering warmed, vaporized gasoline free from air and from gasoline droplets to an internal combustion engine and comprising
    a. a gasoline receptacle, including means maintaining within the receptacle a vapor space above the level of liquid gasoline therein;
    b. a pump communicating with the vapor space in the receptacle for producing a vacuum to urge evaporation of gasoline from tthe receptacle and to compress the resulting gasoline vapors;
    c. a filter communicating with the high pressure side of said pump to remove gasoline droplets from the vapors compressed by the pump;
    d. means for conveying the filtered gasoline vapors to an internal combustion engine;
    e. heating means for heating the gasoline in the gasoline receptacle and for heating the gasoline vapors downstream from the pump, the heating means including a length of coiled tubing carrying heated, pumped radiator fluid and extending into and above the liquid gasoline in the gasoline receptacle, the tubing having an outer, expanded surface from which gasoline may evaporate;
    f. control means maintaining the pressure of vaporized gasoline compressed by the pump, the control means controlling the vaporization rate of gasoline in response to pressure variations within the compressed, vaporized gasoline; and
    g. sealing means sealing the device from contact with outside air, whereby the device delivers warmed vapors of gasoline free of air and gasoline droplets.

9. The device of claim 8 including a filler tank having an upper wall spaced below an upper wall of the gasoline receptacle and providing said means maintaining a vapor space in the receptacle.

10. The apparatus of claim 1 wherein the gas receptacle includes a drain for removing high-boiling gasoline fractions.

11. Gasoline delivery apparatus for delivering vaporized gasoline free from air and gasoline droplets to an internal combustion engine, comprising a gasoline receptacle; filler means for maintaining the receptacle free of air while permitting the addition of gasoline to the receptacle and maintaining within the receptacle a vapor space above the liquid gasoline level;
    a first heater including a heater medium for heating the gasoline within the receptacle and said heater having an expanded surface extending upwardly into the vapor space; a pump communicating with the vapor space in the receptacle for producing a vacuum in the latter to urge evaporation of gasoline from the expanded surface, and to compress the gasoline vapors; and a filter communicating with the high pressure side of the pump to remove gasoline droplets from the vapors compressed by the pump, said filter including means for heating, with said medium, gasoline in the filter; and means for conveying the filtered gasoline vapors to an internal combustion engine; the gasoline receptacle, pump and filter being sealed from contact with the atmosphere, whereby the gas vapors so delivered are air-free.

12. A gasoline delivery device for delivering warmed, vaporized gasoline free from air and from gasoline droplets to an internal combustion engine and comprising:
  a. a gasoline receptacle, including means maintaining within the receptacle a vapor space above the level of liquid gasoline therein;
  b. a pump communicating with the vapor space in the receptacle for producing a vacuum therein to urge evaporation of gasoline from the receptacle and to compress the resulting gasoline vapors;
  c. a filter communicating with the high pressure side of said pump to remove gasoline droplets from the vapors compressed by the pump;
  d. means for conveying the filtered gasoline vapors to an internal combustion engine;
  e. first and second heating means for heating the gasoline in the gasoline receptacle and for heating the gasoline vapors downstream from the pump, respectively, the first heating means including a length of coiled tubing carrying heated, pumped radiator fluid as the heating medium and extending into and above the liquid gasoline in the gasoline receptacle, the tubing having an outer, expanded surface from which gasoline may evaporate;
  f. control means for maintaining the pressure of vaporized gasoline compressed by the pump, and controlling the vaporiztion rate of gasoline in response to pressure variations within the compressed, vaporized gasoline; and
  g. sealing means sealing the device from contact with outside air, whereby the device delivers warmed vapors of gasoline free of air and gasoline droplets.

13. Gasoline delivery apparatus for delivering vaporized gasoline free from air and gasoline droplets to an internal combustion engine, comprising a gasoline receptacle; filler means for maintaining the receptacle free of air while permitting the addition of gasoline to the receptacle and maintaining within the receptacle a vapor space above the liquid gasoline level; a heater for heating the gasoline within the receptacle; a pump communicating with the vapor space in the receptacle for producing a vacuum in the latter to urge evaporation of gasoline in the receptacle and to compress the gasoline vapors; a filter communicating with the high pressure side of the pump to remove gasoline droplets from the vapors compressed by the pump; and means for conveying the filtered gasoline vapors to an internal combustion engine; the gasoline receptacle, pump and filter being sealed from contact with the atmosphere, whereby the gasoline vapors so delivered are air-free.

* * * * *